J. Henderson & C. K. Watson.

Tailors' Measure.

No. 6807X

Patented Oct. 22. 1831.

James Henderson & Cooper K Watson. Zanesville Ohio

Letters Patent

The Schedule referred to in these Letters Patent and making part of the same containing a description in the words of the said James Henderson and Cooper K Watson themselves of their improvement in measuring for and cutting Garments.

Figure 1:
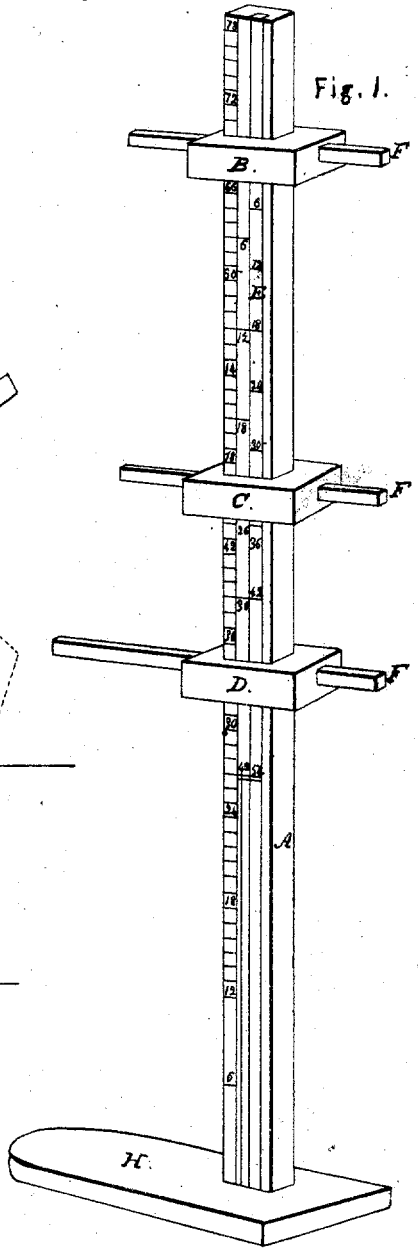

To all to whom these presents shall come. Be it known that We James Henderson and Cooper K. Watson of Zanesville in the County of Muskingum and State of Ohio have invented a new and useful improvement in the art of measuring for and cutting garments. and the following is a full and exact description of the construction and operation of said improvement as invented and improved by us.
There is an upright Standard of sufficient length to include the height of the tallest person say seven feet. This is divided into inches commencing at the bottom. On this upright are three slides as represented in the drawing Fig 1. A being the Standard and B.C and D the three slides which work up and down on the standard and are kept in their place by means of springs or screws. There is a scale (E Fig 1.) of not less than thirty six inches in length which works in a groove in the upright Standard and is made fast by screws to the top slide B. so that when the slide is moved up or down on the Standard the scale will move in the groove This scale is divided into inches commencing at the top which division of inches is marked on one side or edge of the scale. which is divided by a perpendicular line running the whole length. the other side or edge is divided into parts equal to two thirds of an inch commencing at the top as represented in Fig 1. There are three arms F F F. which run through the slides B.C & D horizontally are moveable in the slides and work at right angles with the Standard. The person to be measured is to stand upon the small platform H in which the Standard is fixed with his back to the standard. the in [illegible] Folio 6807x Oct 22, 1831 slide B then is so placed or slipped on the standard that its arm F will touch the bottom of the neck or socket bone, the arm of the arm of the slide D is then placed between his legs and moved up tight in the crotch. By this means the number of inches between B and D are marked on the moving scale at the slide D which number is the exact length of the Body in a perpendicular line. The slide C is then moved to that number on the other edge of the moving scale correspon-ding to the number of inches between B and D. that is to a point at exactly two thirds of the distance from B to D. this point may be termed the balancing or permanent point for the waist and may be varied from (as fashions change) by a scale by which the proper variations may be made for an individual of any given size.

Figure 2:
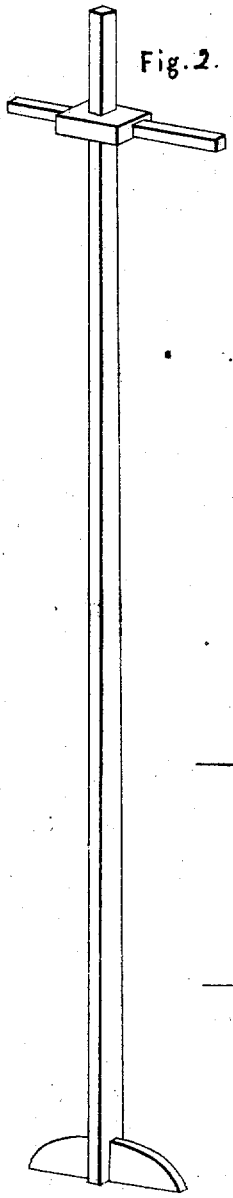
Figure 3:
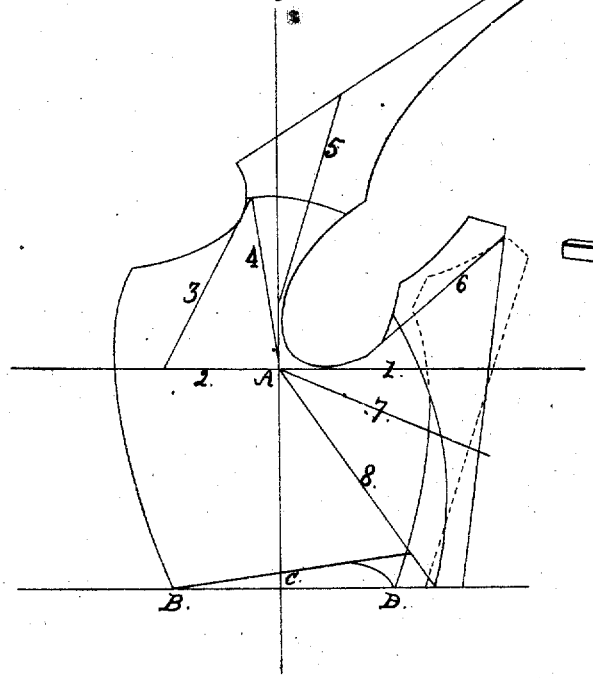

Before thus much of the measure is taken, a leather strap is placed around the Breast close under the arms, on this strap is a moveable strap passing down the centre of the back and at right angles with the breast strap the perpendicular strap is drawn to the waist by a strap placed round that part. by this means the centre of the back is ascertained when the measure is applied. The breast strap is sustained by small straps which pass over each shoulder and are fastened by buckles or slides a small standard (represented by Fig 2) of the same height with the one described (with a square at the foot so that it may stand per-pendicular, and provided with a slide and arm as the other stan-dard) is then used by applying the arm to the centre of the breast, the centre of the back and under each arm, to ensure that the straps pass around the body in a true horizontal line. Then by the shoul-der straps which must join the Breast strap at right angles is ascertained the point of the shoulder. Then from the front A Fig 3, where the shoulder and Breast straps join in front of the shoulder the following measures are to be taken which are marked with corres-ponding numbers on the draft (Fig 3. of the drawings)
1st Under the arm to the point on the breast strap in the centre of the back. 2nd to the centre of the breast. 3rd From the centre of the breast strap on the bones to the centre of the back at the socket bone. 4th From the point 6807x Oct 22, 1831 39

Figure 4:
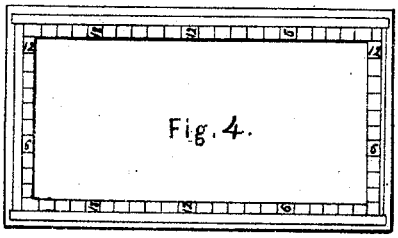

A over the shoulder to the socket bone. 5th from same to centre of the
back on the strap 6th from same under the arm to the socket Bone
7th From same to any point between the centre of the back and waist
to be determined by the projection of the Shoulder blades. 8th From same to the centre of
the waist. For the purpose of drafting the garment we use a square
of the following construction. it is an oblong twenty four inches by four
teen (as represented in Fig 4) the inches being marked on the inner
edge. and the flat side (between the edge where the inches are marked
and the outer edge) containing a groove in which the scales are inser-
ted which are used in drafting garments — having four sides it will
hold a sufficient number of scales for drafting any garment and
by the figures on the different sides we are enabled to take any an-
gles that would facilitate the cutter in his operation. By placing
the square on any line with the corner at any given point and taking
any number on the other side or end. any angle may be obtained which
the draft may require. By this it will be seen that it possesses the ad-
vantages of the square protractor and measure case.
The curve of the waist represented by the line B. C. D in Fig 4. and
the spring of the skirt are obtained as follows — Take the size of the waist
and hips. then by the difference between the two a scale is selected with
which we measure up the side seam the whole difference. then this difference
is to be added to the front line of the skirt at the top. The angle formed
by the uniting of the back and top lines of the skirt should be a right
angle. and before the addition of the difference between the hips and
waist is made, about one inch should be added to the top line in front
to give the natural spring. We claim to be the inventors of the scale in
the groove of the standard by which the length of the body and a certain
[illegible]manent point for the waist are ascertained. and of the straps by
which the various curves and inequalities on the surface of the Body are meas
ured. We also claim to have invented the square described. and the man
ner of ascertaining the curve of the waist and spring of the skirt.

Witnesses
John Huntington
Hamilton Meek.

James Henderson } Ext.
Cooper K Watson } N.Y.

1832 [illegible]